US010871847B2

(12) United States Patent
Shutzberg et al.

(10) Patent No.: US 10,871,847 B2
(45) Date of Patent: Dec. 22, 2020

(54) SENSING FORCE AND PRESS LOCATION IN ABSENCE OF TOUCH INFORMATION

(71) Applicant: Apple Inc., Cupertino, CA (US)

(72) Inventors: Julian K. Shutzberg, Atlanta, GA (US); Baboo V. Gowreesunker, San Francisco, CA (US); Collin R. Petty, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 16/143,374

(22) Filed: Sep. 26, 2018

(65) Prior Publication Data

US 2019/0102031 A1    Apr. 4, 2019

Related U.S. Application Data

(60) Provisional application No. 62/565,639, filed on Sep. 29, 2017.

(51) Int. Cl.
*G06F 3/041*    (2006.01)

(52) U.S. Cl.
CPC .......... *G06F 3/0414* (2013.01); *G06F 3/0418* (2013.01); *G06F 3/04142* (2019.05); *G06F 2203/04106* (2013.01)

(58) Field of Classification Search
CPC ... G06F 3/0414; G06F 3/04142; G06F 3/0418
See application file for complete search history.

(56) References Cited

U.S. PATENT DOCUMENTS

| | | |
|---|---|---|
| 6,504,530 B1 | 1/2003 | Wilson |
| 7,152,482 B2 | 12/2006 | Ueno et al. |
| 7,698,084 B2 | 4/2010 | Soss |
| 7,926,351 B2 | 4/2011 | Masaki et al. |
| 7,926,352 B2 | 4/2011 | Matsushima et al. |

(Continued)

FOREIGN PATENT DOCUMENTS

WO    WO 15/077200    5/2015

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Amare Mengistu
*Assistant Examiner* — Jennifer L Zubajlo
(74) *Attorney, Agent, or Firm* — Brownstein Hyatt Farber Schreck, LLP

(57) ABSTRACT

Disclosed are electronic devices and methods of their operation that use force sensors to detect user applied forces on an input surface and determine their locations on the input surface, using only force sensors. The locations may be determined using weighted averages of the positions of the force sensors and their values. The methods may compare dynamically updated baseline force values to received force sensor values to distinguish user applied forces from changes in the force sensor values caused other sources. After detection of a user applied force, the baseline force values are frozen, and the force sensor values used to find the location on the input surface where the user applied the force. The electronic device can operate according to a state space model, with a first state in which there is no user applied force, and a second state in which there is user applied force.

20 Claims, 15 Drawing Sheets

(56) References Cited

U.S. PATENT DOCUMENTS

| | | | |
|---|---|---|---|
| 8,144,271 B2 | 3/2012 | Han | |
| 8,305,358 B2 | 11/2012 | Klinghult | |
| 8,421,483 B2 | 4/2013 | Klinghult | |
| 8,547,495 B2 | 10/2013 | Lee | |
| 8,553,004 B2 | 10/2013 | Hotelling et al. | |
| 8,560,947 B2 | 10/2013 | Gillespie et al. | |
| 8,618,720 B2 | 12/2013 | Paleczny et al. | |
| 8,629,841 B2 | 1/2014 | Degner et al. | |
| 8,631,567 B2 | 1/2014 | Lee et al. | |
| 8,730,199 B2 | 5/2014 | Sleeman et al. | |
| 8,743,060 B2 | 6/2014 | Hotelling | |
| 8,878,811 B1 | 11/2014 | Baumbach | |
| 8,966,999 B2 | 3/2015 | Evans | |
| 8,970,507 B2 | 3/2015 | Holbein et al. | |
| 8,988,384 B2 | 3/2015 | Krah et al. | |
| 9,081,453 B2 | 7/2015 | Bulea et al. | |
| 9,110,532 B2 * | 8/2015 | Ando | G09G 5/003 |
| 9,116,570 B2 | 8/2015 | Lee et al. | |
| 9,164,605 B1 * | 10/2015 | Pirogov | G06F 3/0416 |
| 9,182,837 B2 | 11/2015 | Day | |
| 9,232,636 B2 | 1/2016 | Ozeki et al. | |
| 9,304,348 B2 | 4/2016 | Jang | |
| 9,348,472 B2 | 5/2016 | Kang | |
| 9,405,369 B2 * | 8/2016 | Modarres | G06F 3/0414 |
| 9,454,268 B2 | 9/2016 | Badaye et al. | |
| 9,519,857 B2 | 12/2016 | Ryhanen et al. | |
| 9,612,690 B2 | 4/2017 | Zirkl et al. | |
| 9,690,408 B1 | 6/2017 | Krah | |
| 9,779,676 B2 | 10/2017 | Al-Dahle et al. | |
| 9,874,965 B2 | 1/2018 | Pedder | |
| 9,891,770 B2 | 2/2018 | Chen et al. | |
| 9,965,092 B2 | 5/2018 | Smith | |
| 9,977,500 B2 | 5/2018 | Westerman et al. | |
| 10,043,469 B2 | 8/2018 | Al-Dahle et al. | |
| 10,101,857 B2 | 10/2018 | Chen et al. | |
| 2006/0144154 A1 | 7/2006 | Ueno et al. | |
| 2006/0284856 A1 * | 12/2006 | Soss | G06F 3/0414 345/173 |
| 2006/0293864 A1 * | 12/2006 | Soss | G06F 3/0414 702/104 |
| 2008/0284925 A1 | 11/2008 | Han | |
| 2009/0002199 A1 | 1/2009 | Lainonen et al. | |
| 2009/0273570 A1 | 11/2009 | Degner | |
| 2009/0273573 A1 | 11/2009 | Hotelling | |
| 2009/0326833 A1 | 12/2009 | Ryhanen et al. | |
| 2010/0162562 A1 | 7/2010 | Lee et al. | |
| 2010/0171900 A1 | 7/2010 | Lee | |
| 2010/0194682 A1 * | 8/2010 | Orr | G06F 3/04886 345/156 |
| 2011/0057899 A1 | 3/2011 | Sleeman et al. | |
| 2011/0080349 A1 | 4/2011 | Holbein et al. | |
| 2011/0134059 A1 | 6/2011 | Paleczny et al. | |
| 2012/0086666 A1 | 4/2012 | Badaye et al. | |
| 2012/0105367 A1 | 5/2012 | Son et al. | |
| 2013/0076646 A1 | 3/2013 | Krah et al. | |
| 2013/0082970 A1 | 4/2013 | Frey et al. | |
| 2013/0096849 A1 | 4/2013 | Campbell et al. | |
| 2013/0181943 A1 | 7/2013 | Bulea et al. | |
| 2013/0256002 A1 | 10/2013 | Ozeki et al. | |
| 2014/0055407 A1 | 2/2014 | Lee et al. | |
| 2014/0098028 A1 | 4/2014 | Kwak et al. | |
| 2014/0320438 A1 | 10/2014 | Yurlov et al. | |
| 2015/0084874 A1 * | 3/2015 | Cheng | G06F 3/04883 345/173 |
| 2015/0084909 A1 | 3/2015 | Worfolk et al. | |
| 2015/0103038 A1 | 4/2015 | Han et al. | |
| 2015/0339001 A1 | 11/2015 | Zirkl et al. | |
| 2016/0062497 A1 | 3/2016 | Huppi et al. | |
| 2016/0092015 A1 | 3/2016 | Al-Dahle et al. | |
| 2016/0370909 A1 * | 12/2016 | Wang | G06F 3/0416 |
| 2016/0378223 A1 | 12/2016 | Hyuga et al. | |
| 2017/0031495 A1 * | 2/2017 | Smith | G06F 3/0414 |
| 2017/0060290 A1 | 3/2017 | Chen et al. | |
| 2017/0060292 A1 | 3/2017 | Chen et al. | |
| 2017/0131840 A1 | 5/2017 | Deichmann et al. | |
| 2017/0242539 A1 * | 8/2017 | Mani | G06F 3/0418 |
| 2017/0285799 A1 | 10/2017 | Iuchi et al. | |
| 2017/0285810 A1 | 10/2017 | Krah | |
| 2017/0336902 A1 | 11/2017 | Smith | |
| 2018/0025694 A1 | 1/2018 | Al-Dahle et al. | |
| 2018/0341363 A1 * | 11/2018 | Wang | G06F 3/044 |
| 2018/0364850 A1 * | 12/2018 | Vosgueritchian | G06F 3/044 |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

Min et al., "Adaptive Touch Sampling for Energy-Efficient Mobile Platforms," Intel Corporation, Hillsboro, OR 97124, 4 pages.

* cited by examiner

SENSING FORCE AND PRESS LOCATION IN ABSENCE OF TOUCH INFORMATION

CROSS-REFERENCE TO RELATED APPLICATIONS

This application claims the benefit under 35 U.S.C. § 119(e) of U.S. Provisional Patent Application No. 62/565,639, filed Sep. 29, 2017, which is incorporated by reference as if fully disclosed herein.

FIELD

The present disclosure generally relates to input devices and methods for sensing force or force inputs applied to input surfaces of electronic devices.

BACKGROUND

Electronic devices are commonplace in today's society. Example electronic devices include smart watches, cell phones, tablet computers, personal digital assistants, and the like. Some of these electronic devices have input surfaces that use force sensors and/or touch sensors. Values from the touch sensors can be used to determine baseline force values of the force sensors in the absence of a user's touch, as well as to locate a position of the user's touch or a force value on the input surface. This can allow for calibration and adjustment of the values of the force sensors when a user's touch or force value is detected by the touch sensors.

This operational approach thus uses two types of sensors. Efficiencies and operational flexibility could be gained if the location and amount of force applied by a user to an input surface could be determined using only values from the force sensors. Part of such a determination would be distinguishing actual user applied forces to the input surface from baseline readings of the force sensors that occur even without an actual user-applied force on the input surface. Further, efficiencies can gained if a location of a user-applied force on the input surface could be determined using the force sensor values. Touch sensors could be eliminated or reduced in number.

The embodiments disclosed below are directed to achieving such efficiencies.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Disclosed herein are electronic devices having input surfaces through which a user can enter inputs by applying a force input at a specific location. Also disclosed are methods for operating such electronic devices.

A first embodiment described herein is a method of detecting a user input on an input surface of an electronic device. The electronic device comprises an input surface and a force sensor. The method comprises receiving a force sensor value from the force sensor and a baseline force value for the force sensor. When the force sensor value exceeds the baseline force value by more than a first threshold, the baseline force value is frozen and the electronic device is operated according to the force sensor value being a detected user input on the input surface. When the force sensor value does not exceed the baseline force value by more than the first threshold, the electronic device is operated according to no force input being received from a user on the input surface, and the baseline force is updated toward the force sensor value.

Additional and/or alternative embodiments described herein include methods of operating an electronic device having an input surface and a first and a second force sensor, each able to detect an input applied to the input surface. The method includes receiving a first force sensor value from the first force sensor and a second force sensor value from the second force sensor. The first and second force values are used in determining a location of the input on the input surface. This determination is done without reference to a touch sensor. Further embodiments may have third force sensor and a fourth force sensor, and the methods then include receiving a third force sensor value from the third force sensor and receiving a fourth force sensor value from the fourth force sensor. In these methods the location of the input may be determined by forming a weighted average using positions of the force sensors and the respective force sensor values.

Also described herein are additional and/or alternative methods directed to determining whether a force input arises from a user rather than another cause. Such methods include receiving a first baseline force value corresponding to the first force sensor. In the case that the first force sensor value exceeds the first baseline force value by more than a first threshold, the method freezes the value of the first baseline force value, and operates the electronic device according to a user having generated the first force sensor value. In the case that the first force sensor value does not exceed the first baseline force value by more than the first threshold, the method updates the value of the first baseline force value, and operates the electronic device according to no user having generated the first force sensor value. Updating the first baseline force value may include adding a value to it; the value may be limited to a maximum update limit.

Further embodiments of the methods may further include determining that the first baseline force value subtracted from the first force sensor value is negative and exceeds a second threshold in magnitude. In such case, the first baseline force value is updated to equal the first force sensor value. A touch sensor value may be received from a touch sensor, and its validity determined. If it determined to be valid, the touch sensor value may be used to update the determined location of the force input on the input surface.

Also disclosed is an electronic devise that includes an input surface, a force sensor positioned proximate to a boundary of the input surface, and a processor. The force sensor is configured to detect an input applied to the input surface and provide a force sensor value to the processor. The processor is configured to operate in response to the input applied to the input surface by: receiving the force sensor value and receiving a baseline force value for the force sensor. When the force sensor value exceeds the baseline force value by more than a first threshold, the baseline force value is frozen and the electronic device is operated according to a user having applied a force input to the input surface. When the force sensor value does not exceed the baseline force value by more than a first threshold, the baseline force value is updated toward the force sensor value and the electronic device is operated according to no force input having been applied to the input surface.

Additional and/or alternative embodiments of electronic devises are disclosed that include: an input surface, a first and a second force sensor at respective first and second positions that are proximate to a boundary of the input surface, and a processor. The first and second force sensors are configured to detect a force input applied to the input surface and provide corresponding first and second force sensor values to the processor. The processor is configured to receive respective first and second force sensor values from the first and second force sensors and determine a location on the input surface of the applied force input, without reference to a touch sensor. The location on the input surface of the applied force input may be determined using a weighted average. The electronic device may include a third force sensor and a fourth force sensor, also proximate to the boundary of the input surface, that can also detect the force input applied to the input surface and provide respective force sensor values. The third and fourth force sensor values may also be used in the determination of the weighted average.

In further embodiments, the processor may be further configured to receive, corresponding to the first force sensor, a first baseline force value. In the case that the first force sensor value exceeds the first baseline force value by more than a first threshold, the processor is further configured to freeze the first baseline force value and operate the electronic device according to a user input having generated the first force sensor value. In the case that the first force sensor value does not exceed the first baseline force value by more than the first threshold, the processor is further configured to operate the electronic device according to no user input having been applied to the input surface, and update the first baseline force value toward the first force sensor value.

Also disclosed is a method of operating an electronic device having an input surface, a processor, and multiple force sensors, each force sensor configured to provide a respective force sensor value measuring a force applied at a respective position on the input surface. The method includes receiving, at the processor, respective force values from the plurality of force sensors. The method includes determining from the respective force sensor values, and without reference to a touch sensor value, that a force applied to the input surface is applied by a user. When the force applied to the input surface is determined to be applied by the user, the electronic device is operated according to a first operational state, and a location on the input surface at which the force was applied is determined. When the force applied to the input surface is determined not to be applied by the user, the electronic device is operated according to a second operational state.

Also disclosed is a method of operating an electronic device having an input surface, a processor, and multiple force sensors, each force sensor configured to provide a respective force sensor value measuring a force applied at a respective position on the input surface. The method includes determining an operational state and operating the electronic device according to the determined operational state, detecting a functional change in at least one force sensor value, and switching the operational state when a functional change is detected. A first operational state corresponds to no user applied force on the input surface, and a second operational state corresponds to a user applied force being applied to the input surface. In the first operational state the electronic device receives force sensor values and corresponding baseline force values, and updates the latter to track the former as long as their differences do not exceed a threshold. When operating according to the second operational state the baseline force values are fixed, and a location of the force being applied to the input surface is determined. The location may be determined by a weighted average of the force sensor values.

BRIEF DESCRIPTION OF THE DRAWINGS

The disclosure will be readily understood by the following detailed description in conjunction with the accompanying drawings, wherein like reference numerals designate like structural elements.

Figure 1A:
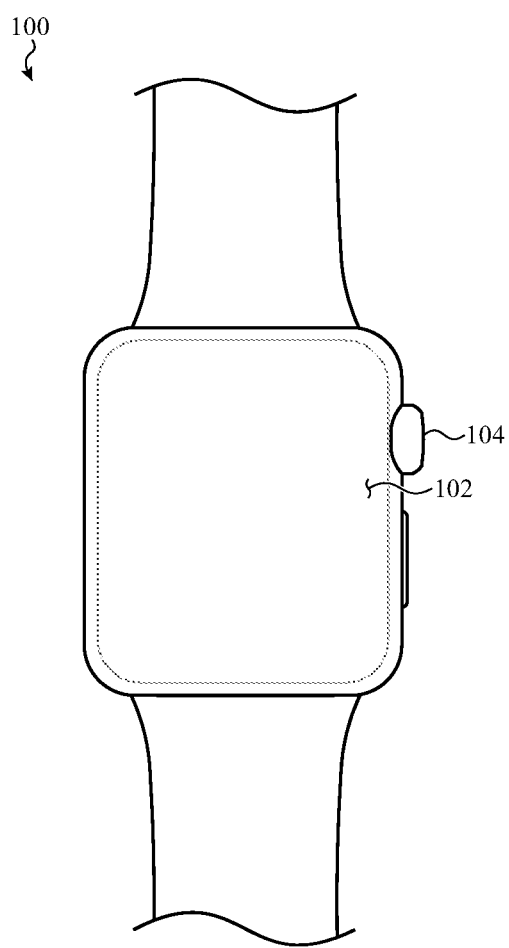
FIG. 1A illustrates a smart watch that may use one or more embodiments.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some electronic devices may use two distinct types of sensors in conjunction to detect a user input on an input surface. A user may enter an operational command to the device by applying a force input (herein also, an "input force," "applied force," or just an "input") at a particular location on the input surface. For example, the input surface may also function as a display surface that presents an icon that can be pressed (i.e., a force input is applied) by the user to initiate an application or program on the electronic device. The input surface may include a cover glass and an array of input/output electronics and sensors positioned below the cover glass.

Such electronic devices may use both an array of force sensors and a configuration of touch sensors. The touch sensors may be configured to provide accurate detection of the location on the input surface of a user applied force. Such touch sensors can also serve to detect that a force on the input surface actually arises from a user input rather than, for example, temperature changes of a cover glass increasing a force measured by a force sensor. The force sensors can serve also to detect that a user is applying an input to the input surface, and to determine the location on the input surface of the applied force. Greater efficiency may be achieved if just force sensors could be used, or used primarily, for detecting and location an input to the electronic device.

The embodiments described herein are directed to electronic devices, and methods of their operation, that have input surfaces on which a user enters an operational command on the input surface. For example, the input surface may also function as a display surface that presents an icon that can be pressed by the user to initiate an application or program on the electronic device. The input surface may include a cover glass and an array of input/output electronics and sensors positioned below the cover glass. The sensors can be force sensors, and may be used in conjunction with touch sensors.

The force may be applied by a press from a finger or stylus, or other localized source, on the input surface. The force may be detected by one or more force sensors positioned to detect a user applied force on the input surface. In some embodiments the force sensors are positioned on the underside of the input surface or cover glass. In some embodiments the force sensors are positioned along or proximate to edges of the input surface. In the devices and embodiments described, the sensors may be piezoelectric, piezoresistive, capacitive, or another type of sensor.

The force sensors can be used for detecting not just that an input is being applied to the input surface but also determining the location on the input surface at which the input is being applied. The force sensor values can be used as weights in a weighted average or sum with the positions or coordinates of the force sensors, analogous to finding a center of mass. Such weighted average calculations can be determined at design phase or at manufacture, and the results stored in a look-up table of the electronic device for fast access.

Detecting, locating, and measuring a user applied force on an input surface using just force sensors introduces various issues. One such issue is distinguishing an actual user applied force from a nonzero force value caused by alternative sources. A second issue is the accurate detection of the location on the input surface at which the force is applied.

The first issue that may arise when a force sensor measures a nonzero force, or detects a change in the force even when no user applied force occurs. This can arise due to changes in air pressure, motion of a user's arm in the case of a smart watch, expansion or contraction of a cover glass due to temperature change, and other causes. If such non-user changes in force sensor values can be tracked, such as by tracking and updating baseline readings of the force sensors, then true user applied forces may be more easily distinguished from other sources of changes in force sensor values.

The second issue of using force sensors with reference to a touch sensor is to detect location of user input forces on the input surface. In various embodiments disclosed below the force sensors are positioned on the periphery of the input surface, and weighted averages are calculated to detect a location of a user applied force. In some examples, calculating the weighted averages uses values from four sensors, with two force sensors used to determine a vertical ("y") coordinate, and the another two used to determine a horizontal ("x") coordinate, of the location of the applied force. In some embodiments the determined location is subsequently used in conjunction with values from one or more touch sensors to refine the detection and location determinations.

While the embodiments described below are directed to using force sensors, it will be clear to one of skill in the art that the embodiments by also make use of touch sensors. Such touch sensors may be used to confirm or refine force sensor values and estimated locations of the user applied force.

These and other embodiments are discussed below with reference to FIGS. 1A-11B. However, those skilled in the art will readily appreciate that the detailed description given herein with respect to these Figures is for explanatory purposes only and should not be construed as limiting.

FIG. 1A illustrates an example electronic device that may incorporate one or more of the embodiments disclosed herein. The electronic device shown in FIG. 1A is a smart watch 100 having a display and/or input surface 102 on which images or other visual data may be presented to a user. The smart watch 100 may also include a separate mechanism, such as the crown 104, by which a user can provide input to the smart watch 100.

A user may provide an input to the smart watch 100 by applying a force to the display and/or input surface 102 at a specific location on the input surface 102, such as at the location of a displayed icon. A user may apply an force by a finger, a stylus, or another means. The embodiments used in the smart watch 100 may function to determine the location of the applied force, and distinguish user applied forces from other sensed forces, as just described.

Figure 1B:
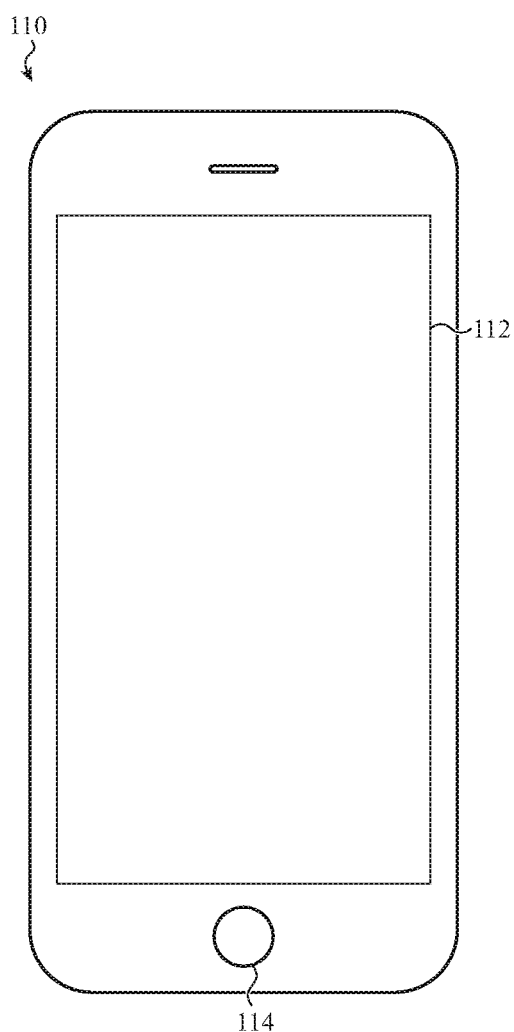
FIG. 1B illustrates a smart phone that may use one or more embodiments.

FIG. 1B shows a different electronic device that may also use various embodiments discussed below. The electronic device in FIG. 1B is a smart phone 110. The smart phone 110 may include a display and input surface 112 that can function both to display visual images and receive inputs by detecting user applied forces, as described above. The smart phone 110 may also have a dedicated mechanism, such as push button 114, by which a user can enter operational inputs to affect its operation.

In alternative configurations, or in other electronic devices, there may be more than one display and/or input surface. In such alternative devices, one surface may be a dedicated display surface, and an additional surface may be a dedicated input surface. Hereinafter "input surface" will denote a surface through which an input to the electronic device may be entered by applying a force or touch to the surface.

Figure 2A:
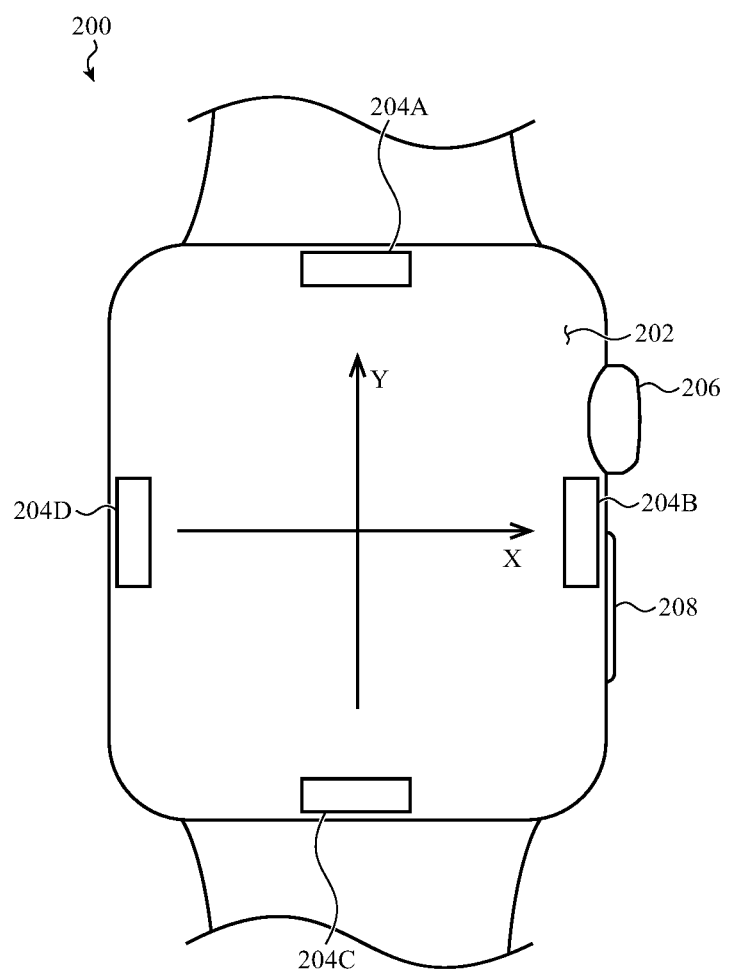
FIG. 2A illustrates a smart watch with four force sensors, according to an embodiment.

FIG. 2A illustrates an example electronic device that may include embodiments disclosed below. In this case the electronic device is a smart watch 200, having a crown 206 and a push button 208 for user input. The smart watch 200 also includes an input surface 202 through which a user may enter inputs to the smart watch 200 by applying a force, such as by pressing on the input surface 202 with a finger, a stylus, or another means. The input surface 202 may also be able to display visual outputs. The input surface 202 may include a cover glass or other material.

The smart watch 200 shown in FIG. 2A includes four force sensors, 204A-D, positioned on the underside of the input surface 202 and located centrally at each of the four edges of the input surface. Other electronic devices that may use the embodiments disclosed herein may have more or fewer than four force sensors, and may use the force sensors in combination with other sensors for determining a force or touch input location on an input surface, such as input surface 202. The location can be given with respect to the indicated virtual (i.e., not actually displayed) coordinate system having origin at the center of the input surface 202. In alternative embodiments the coordinate system origin may be at a corner of the input surface 202, or the location may be determined without reference to a coordinate system.

The smart watch 200, and other electronic devices according to the embodiments, can include one or more processors or processing units configured to control operation of the electronic device in response to received inputs and signals. As used herein a "processing unit" or "processor" will denote any combination of electronic circuits and components operable to receive inputs, and produce an output response based on the inputs that can affect operation of the electronic device. Examples of such processors or processing units include microprocessors, microcontrollers, application specific integrated circuits (ASICS), digital signal processors (DSPs), field programmable gate arrays (FPGAs), operational amplifiers, one or more logic circuits, and other circuits and components as would be known to one of skill in the art. Operations of the processor may be completely hardwired, or alternatively based on programming implemented either in software or firmware.

Figure 2B:
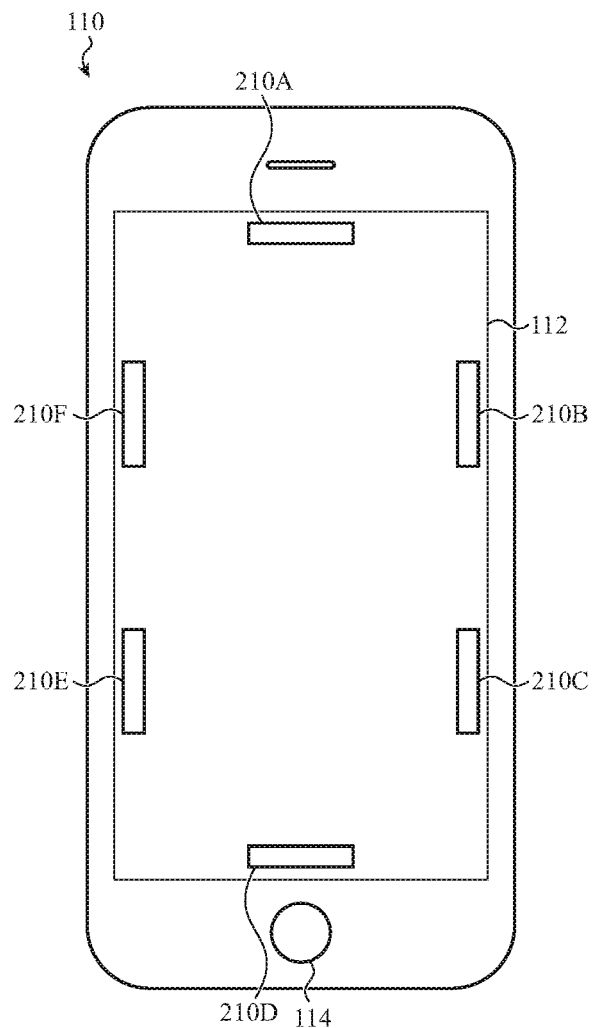
FIG. 2B illustrates a smart phone with multiple force, according to an embodiment.

FIG. 2B illustrates further details of the electronic device (smart phone) 110 discussed in FIG. 1B. The electronic device 110 includes six force sensors 210A-F disposed proximate to the boundary or edges of the input surface 112. The six force sensors 210A-F may be positioned below the input surface 112.

At a given time, a weighted average of respective force sensor values from the six force sensors 210A-F can be calculated and used to detect a user input. The force sensor values of the six force sensors 210A-F may also be used to determine the input's location on the input surface 112. The location may be determined by a processor of the electronic device 110 forming a weighted sum of the positions of the six force sensors 210A-F. The positions of the six force sensors 210A-F may be their respective coordinates with respect to a virtual coordinate system for the input surface 112, analogous to the one shown on the watch of FIG. 2A. Alternatively, the location may be determined by using the six force sensor values with a look-up table. Such a look-up table can be created by applying (such as at design, manufacture, or calibration) known input forces at various locations on the input surface 112, and observing the respective force sensor values. In use, when an applied force produces force sensor values not among those recorded, interpolation may be used with the values in the look-up table.

Figure 3A:
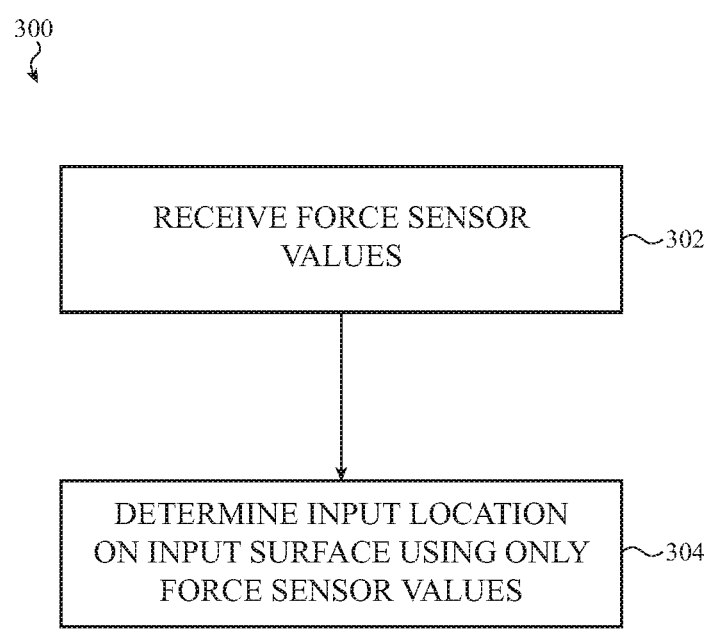
FIG. 3A is a flow chart of a method for operating an electronic device, according to an embodiment.

FIG. 3A is a flow chart of a method that may be used by an electronic device to determine a location of an input on an input surface of the electronic device. The electronic device includes multiple force sensors configured to detect forces acting on an input surface of the electronic device.

At stage 302, the force sensors detect and measure force sensor values on the input surface. The force sensor values are then received for analysis, such as by a processor.

At stage 304, using only the force sensor values and without referencing any touch sensor data or values, an input location for the applied force is determined. The location may be determined, as described above, by calculating a weighted average of the positions of six force sensor, with the force sensor values used as the weights. In a particular example, when the positions of the force sensors are given by respective coordinates: $<X_A, Y_A>, <X_B, Y_B>, \ldots, <X_F, Y_F>$, and the force sensor values are $F_A, F_B, \ldots, F_F$, the weighted average for the location of applied force is given by $$(F_A/S)*<X_A,Y_A>+(F_B/S)*<X_B,Y_B>+ \ldots +(F_F/S)*<X_F, Y_F>, \text{ where } S=F_A+F_B+ \ldots +F_F$$

That is, each force sensor's coordinates are multiplied by the respective force sensor value, normalized by the sum of all the force sensor values. In this paper, a "weighted average" will assume that the stated weights have been so normalized.

While determining a location of a user applied force on an input surface can be given by the methods just described, these methods presume that the input results from a user, and is not an extraneous or erroneous measurement. The method of FIG. 3A can be used with the following method.

Figure 3B:
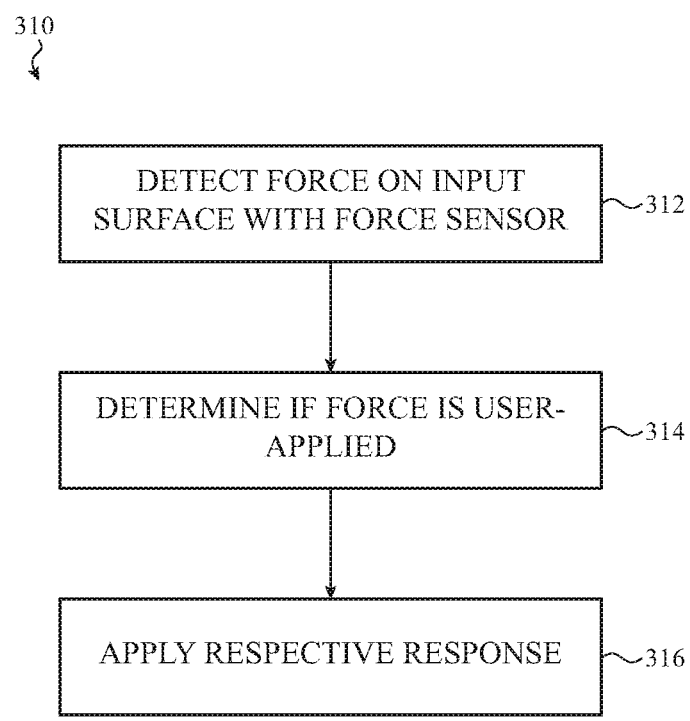
FIG. 3B is a flow chart of a method for operating an electronic, according to an embodiment.

FIG. 3B is a flow chart of a method 310 of operating an electronic device having an input surface, one or more force sensors, and a processor. The force sensors are configured to detect an input, such as an input force, impinging on the input surface and send signals representing the force sensor values to the processor.

At stage 322, the electronic device measures one or more forces impinging on the input surface by using the force sensors. The force sensors may themselves include electronic components that apply signal conditioning, such as noise filtering, to produce the signals representing the force sensor values. The force sensor values are then sent to, or received by, the processor.

At stage 314, the processor of the electronic device applies operations and methods, as described below, to determine if a force sensor value was a result of a user applied force impinging on the input surface, or results from alternative sources. Alternative sources for a detected force on the input surface may result from thermal expansion of the input surface or other components, such as a cover glass or internal electronic circuitry of the electronic device. Such alternative sources can also include atmospheric changes in the ambient environment of the electronic device, or immersion of the electronic device in water (such as with a water-proof electronic device worn during swimming). Other non-user sources may cause the force sensors to detect a force applied to the input surface.

One basis for distinguishing a user input from such alternative sources of force is the rapidity with which the force sensor values departs from a baseline force value. The latter may be continually updated to track ambient operating or environmental conditions, whereas a user input may be characterized by the rapid change away from the baseline force value. This can reduce or eliminate the need for an auxiliary touch sensor (i.e., in addition to the force sensors) that is configured to determining that a user is the source of an input. In some embodiments, a touch sensor can be used in conjunction with the force sensors, such as a check or a refinement of the information determined using only the force sensors.

At stage 316, if the processor concludes that a user applied the force to the input surface, the processor may change one or more operations of the electronic device. Such changes include altering a display on the input surface, initiating or affecting operation of a program or application, or freezing or changing an internal parameter, as described below, or another operation.

In the case that a user is determined to have applied the measured force, the internal state of the electronic device may be changed from monitoring the input surface for applied forces to monitoring the input surface for cessation of the user applied force. Also, the force sensor values may be used to determine or approximate a location on the input surface at which the force was applied. The location can be used as an input for deciding how the operation of the electronic device is to be changed; for example, the location may be the location of a first icon that is separated from a second.

If instead the processor concludes that a user did not apply the force to the input surface, the electronic device can continue in the state of monitoring the input surface for a user applied force. The processor may update internal parameters related to monitoring the input surface.

FIGS. 4-7 illustrate aspects of various embodiments by which electronic devices may distinguish a force on an input surface of an electronic device specifically caused by a user from a force originating from alternative sources, as discussed above. In particular, the embodiments are such that the determination that the force is applied by a user can be made without referencing a separate touch sensor.

The embodiments can use a variation or deviation of a force sensor value from a baseline force value for the force sensor. As long as no user input is detected, the baseline force value may be updated over time to track or correlate with the current force sensor value of the force sensor.

Figure 4:
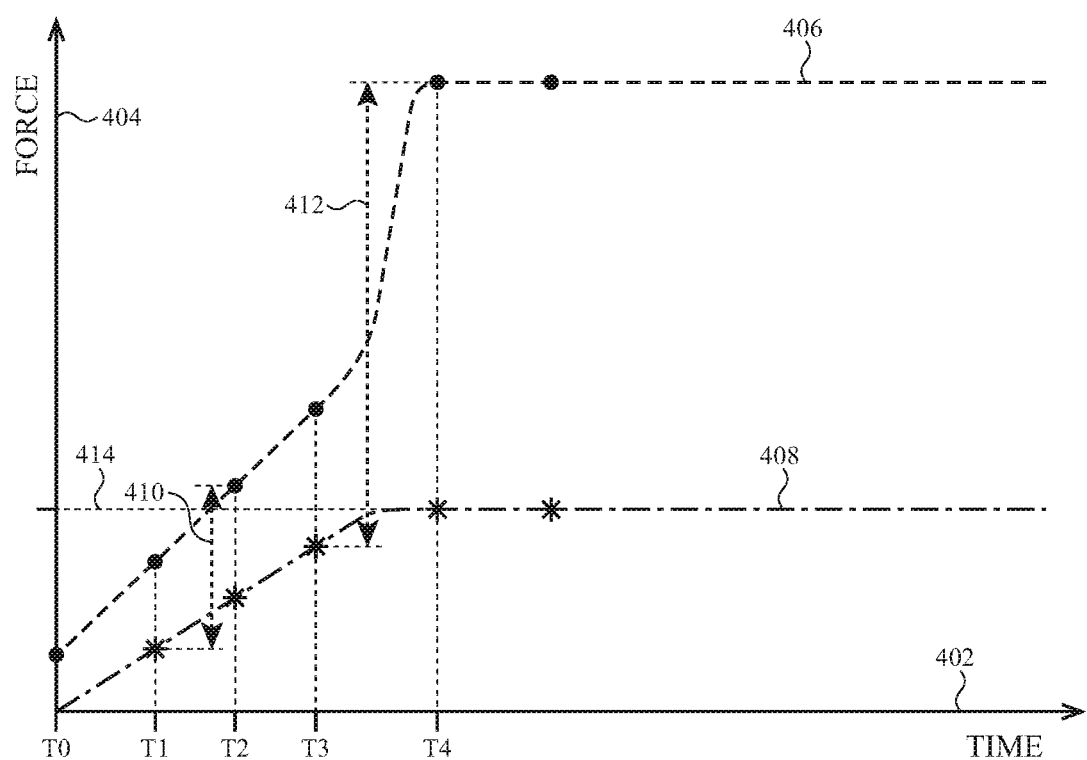
FIG. 4 shows a graph of a force sensor value and baseline force value, according to an embodiment.

FIG. 4 shows graphs 400 of baseline force values 408 and a force sensor's values 406 plotted over a time 402. The baseline force values 408 and the force sensor's values 406 are plotted with respect to the force axis 404. The graphs 400 are exemplary only, and are intended to illustrate certain operations of various embodiments over a time interval. The graphs 400 show exemplary qualitative behavior, and so specific units on the axes are not used.

When the electronic device has multiple force sensors, some embodiments may have a corresponding baseline force value tracked for each force sensor. The operations described below for the specific example of the force sensor values 406 and the respective baseline force values 408 may then be applied to each pair of force sensor values and respective baseline force values.

The graphs of the force sensor values 406 and the baseline force values 408 may be either interpolated values from values measured at discrete time instances, or may represent continuous force values. The embodiments disclosed are operable with either continuous analog inputs, or with discrete time samples. In the latter case, the time step between discrete time samples may have either a fixed step size, or have a non-uniform step size. In the following discussion, for simplicity of exposition, it will be assumed that the graph are interpolations of values measured at discrete time steps, such as the discrete time values $T_0$, $T_1$, $T_2$, $T_3$, and $T_4$.

In the example shown, at initial time $T_0$ the baseline force value and the force sensor's value are nearly equal. For example, at power up of the electronic device, or initiation of monitoring the input surface for a user applied force, the baseline force value may be given an initial value of zero. Alternatively, the baseline force value may be initiated with another value, such as the measured force sensor value.

As time proceeds, a force on the input surface, as measured by the force sensor, may increase, such as by acceleration of the electronic device, increasing air pressure or temperature, sensor drift, or other causes. Such environmentally induced changes typically are slower than increases in the measured force due to a user input. At time $T_1$, the force measured by the force sensor has increased by certain amount. If the increase in the force sensor value above the current baseline force value does not exceed a first threshold, the method decides that the increase is not due to a user input, but rather to environmental causes. The baseline force value is updated by adding an update value to more closely approximate the measured force sensor value, as shown by the increase in the baseline force value graph 408 from $T_0$ to $T_1$.

The update value by which the baseline force value is increased to track the force sensor value may be limited by a maximum update limit. This is the particular situation shown in FIG. 4. Alternatively, the baseline force value can be updated or reset to equal the measured force sensor value. The former embodiment may be used to reduce the effects of noise or other sources that can produce false readings or spikes in the force sensor values. The latter embodiment may be used if filtering has been applied to the raw force sensor values.

Similarly, from times $T_1$ to $T_2$ the force sensor value increases by the difference 410. The increase is determined to be less than the first threshold, and so the baseline force value is updated to track the force sensor value. Similarly, from times $T_2$ to $T_3$ the increase in the force sensor value from the baseline force value is determined to be less than the first threshold, and the baseline force value is updated to track the force sensor value.

In some embodiments, when alternatively the force sensor value has decreased and the difference when the baseline force value is subtracted from the force sensor value is negative, the baseline force value may be decreased to maintain tracking with the force sensor value. Methods in further embodiments for when such a difference is negative are explained below with respect to FIG. 6 and FIG. 7.

However, from times $T_3$ to $T_4$ there is a large increase 412 in the force sensor value above the baseline force sensor value. The increase exceeds the first threshold, so the method makes the decision that a user press on the input surface caused the increase in measured force sensor value.

When such an increase is detected, in some embodiments the method fixes or freezes the value of the baseline force value for subsequent times, such as times from $T_4$ onwards. This is shown as the freeze value 414 on the force axis 404. The freeze value 414 may be chosen as the value of the baseline force at time $T_3$ or may include an increase based on the rate of change of the force sensor value prior to the large increase 412.

While FIG. 4 shows the interpolated graphs of discrete time samples of the force sensor values and the baseline force values, with the operations discussed above performed digitally at sequential discrete time steps, in some embodiments the operations may also be performed in continuous time with analog circuitry. For example, in some embodiments a difference between an analog force sensor value and an analog baseline force value may be determined using an operational amplifier. The comparison of that difference to the first threshold may then be implemented in real time using a comparator, which may have hysteresis and a capacitive filter on the input to prevent false triggering on noise spikes. In another embodiment, the difference between the analog force sensor value and the analog baseline force value can be applied to an analog differentiating circuit to detect large fast swings in the difference.

Figure 5:
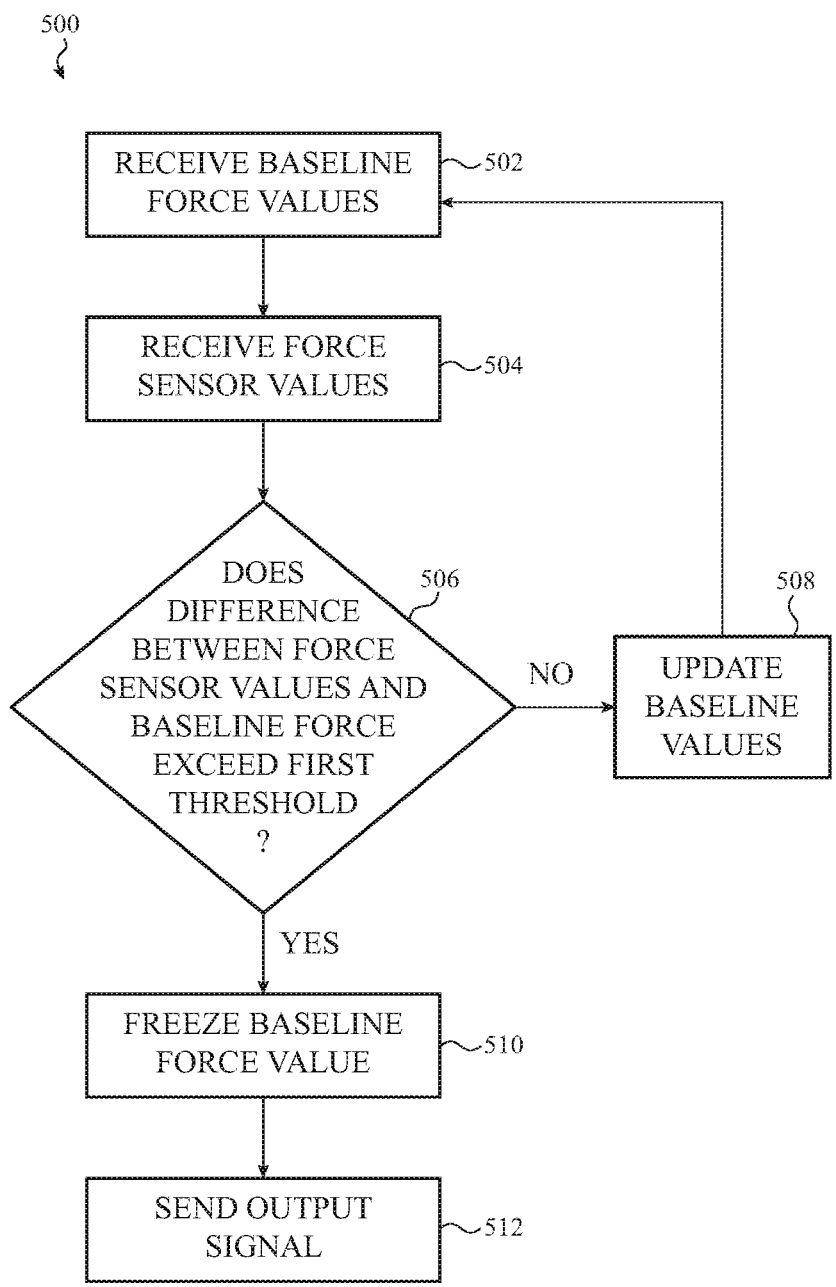
FIG. 5 is a flow chart of a method for operating an electronic device with an input surface and force sensors, according to an embodiment.

FIG. 5 is a flow chart of a method 500 of operating an electronic device having an input surface, one or more force sensors, and a processor. The method operates, in part, to monitor the force sensors to detect a user applied force on the input surface.

At stage 502 a baseline force value corresponding to a respective force sensor is received in the processor of the electronic device. The initial baseline force value can be received from a memory, initialized as zero, initialized at the force sensor value, or otherwise initialized. At stage 504 the processor receives a force sensor value from the respective force sensor.

At stage 506, a difference between the force sensor value and the respective baseline force value is made; i.e., the baseline force value is subtracted from the force sensor value. The difference is compared to a first threshold to determine how to proceed subsequently.

If the difference is positive and less than the first threshold, the processor sends signals to operate the device as though a user input on the input surface has not been made. In this case the operational flow proceeds to stage 508, in which the baseline force value is updated to more closely approximate the force sensor value. Then the operational flow returns to stage 502, in which the updated baseline force value is used, and stage 504, at which a subsequent force sensor value is received. As long as the calculated differences are less than the first threshold, this process continues iteratively to monitor the input surface for any user applied force.

For electronic devices having multiple force sensors, the decision that no user input has occurred may be based on whether the multiple differences between the force sensors' values and the respective baseline force values are all less than the first threshold. In other embodiments the decision that no user input has occurred may be based on a combination of: the number of differences that are below the first threshold, the total of the force sensor values, the average of the force sensor values, or other factors.

If, alternatively, at stage 506 the difference is positive and more than the first threshold, a determination is made that a user applied an input force to the input surface to produce the measured force sensor value. Operational flow then proceeds to stage 510. For electronic devices having multiple force sensors, the decision that a user input has occurred may be based on whether at least one of the multiple differences between the force sensors' values and the respective baseline force values exceeds the first threshold. In other embodiments this decision may be based on whether a majority of the multiple differences between the force sensors' values and the respective baseline force values exceed the first threshold.

At stage 510, the baseline force value is fixed, and not updated. The fixed baseline force value can be stored until, for example, it is determined that the user is no longer applying a force. For embodiments with multiple force sensors, all baseline force values can be frozen (i.e., fixed).

At stage 512, the processor sends at least one output signal to the electronic device or its components to operate according to a user having applied a force to the input surface. The new operations can include changing images displayed on the input surface, initiating operation of a program or application, altering how the input surface is monitored, or other operations based on the determination that a user is applying an input force.

In some embodiments the first threshold may be adapted dynamically during operation of the electronic device. For example, the particular amount of force typically applied by a user can be observed and the first threshold adapted accordingly to better distinguish actual user applied force from other causes of force sensor readings.

Figure 6:
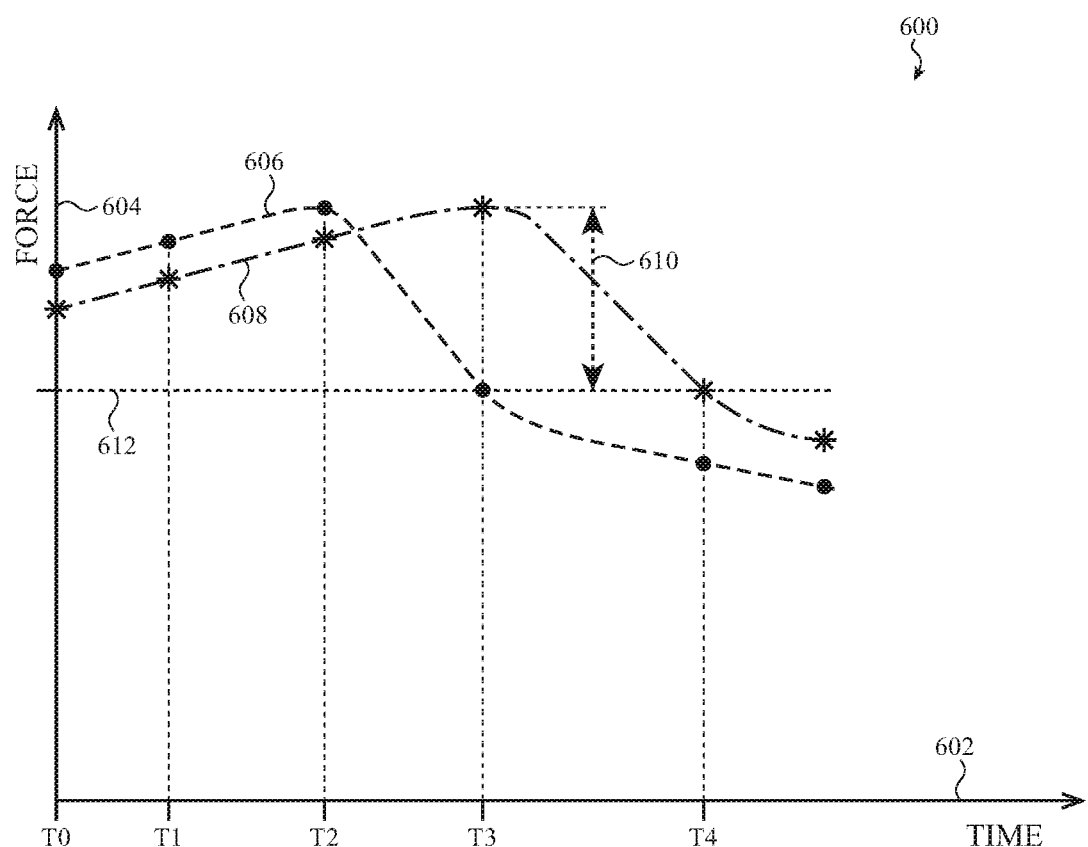
FIG. 6 shows a graph of a force sensor value and baseline force value, according to an embodiment.

FIG. 6 shows interpolated graphs 600 of discrete time samples of a force sensor's values 606 and respective baseline force values 608. These values are plotted on the time axis 602 with respect to the force axis 604.

The graphs 600 show the baseline force value 608 tracking the force sensor values 606 at times $T_1$ and $T_2$, such as by the method described with respect to FIG. 5.

From time $T_2$ to $T_3$ the force sensor value decreases by an amount 610 so that the difference between the force sensor value and the baseline force value is negative, and exceeds a second threshold in magnitude. In this case, the baseline force value is updated to equal the decreased force sensor value.

Figure 7:
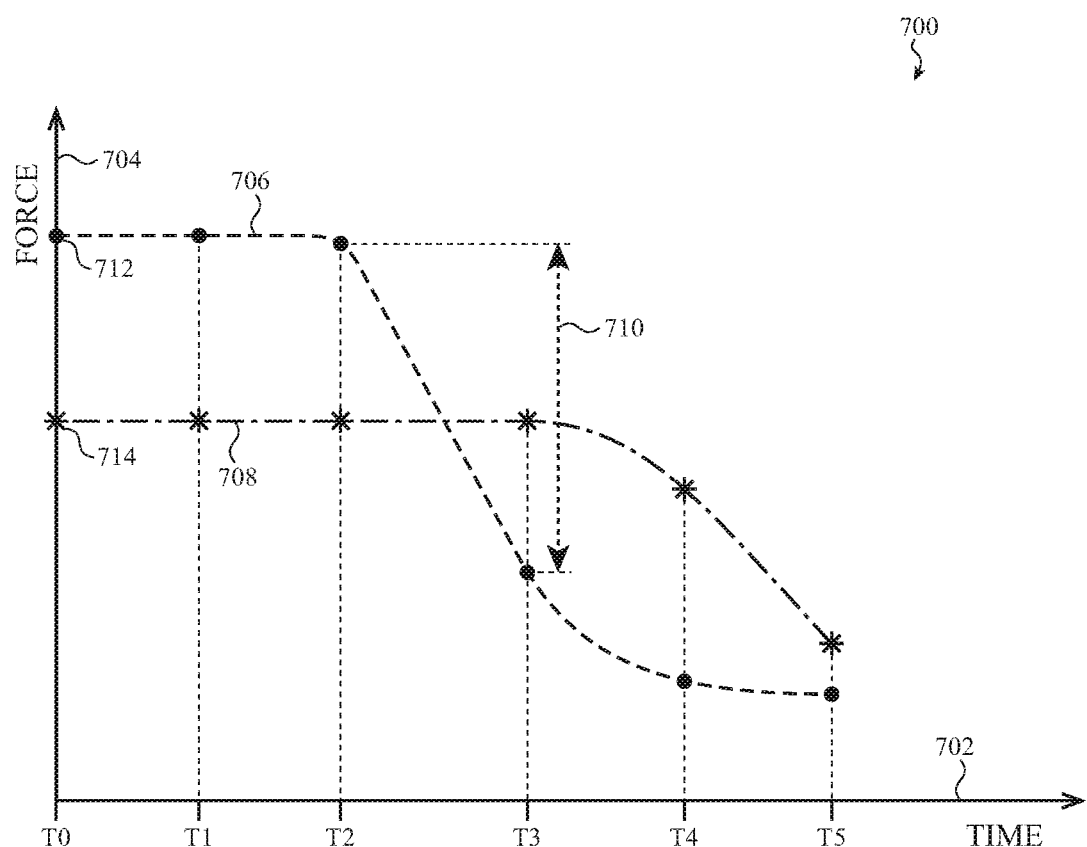
FIG. 7 shows a graph of a force sensor value and baseline force value, according to an embodiment.

FIG. 7 shows the interpolated graphs 700 of discrete time samples of a force sensor's values 706 and the respective baseline force values 708, both plotted over the time axis 702 with values as given on the force axis 704. The graphs 700 reflect the force sensor's values 706 and the respective baseline force values 708 after a determination has been made that a user is applying a force on the input surface. Consequently, the baseline force values 708 are shown as initially having been fixed at a value 714, and so no tracking (such as at time $T_1$) toward the larger force sensor value 712 is applied.

There is a large decrease 710 between the force sensor value at time $T_2$ to the force sensor value at the time $T_3$ due to release of the user applied force on the input surface. In the situation shown, for the subsequent time intervals $T_3$ to $T_4$, and $T_4$ to $T_5$, the force sensor values may only decay to zero, rather than be immediately reset to zero, to account for relaxation of the material in a cover glass of the input surface.

When the large decrease in the force sensor values between times $T_2$ to $T_3$ exceeds a third threshold, a decision is made that the user has stopped applying a force. Thereafter the processor begins operations so that the baseline force values will be resume tracking the force sensor values. In the embodiment shown in FIG. 7, at the subsequent sample times $T_4$, $T_5$, and thereafter, the baseline force values are updated to logarithmically approach the force sensor values. Once the difference between the baseline force value and the force sensor value is within a selected tolerance, the processor may resume a method, such as a method discussed in relation to FIG. 5, for monitoring the input surface to detect a subsequent user applied force.

Figure 8:
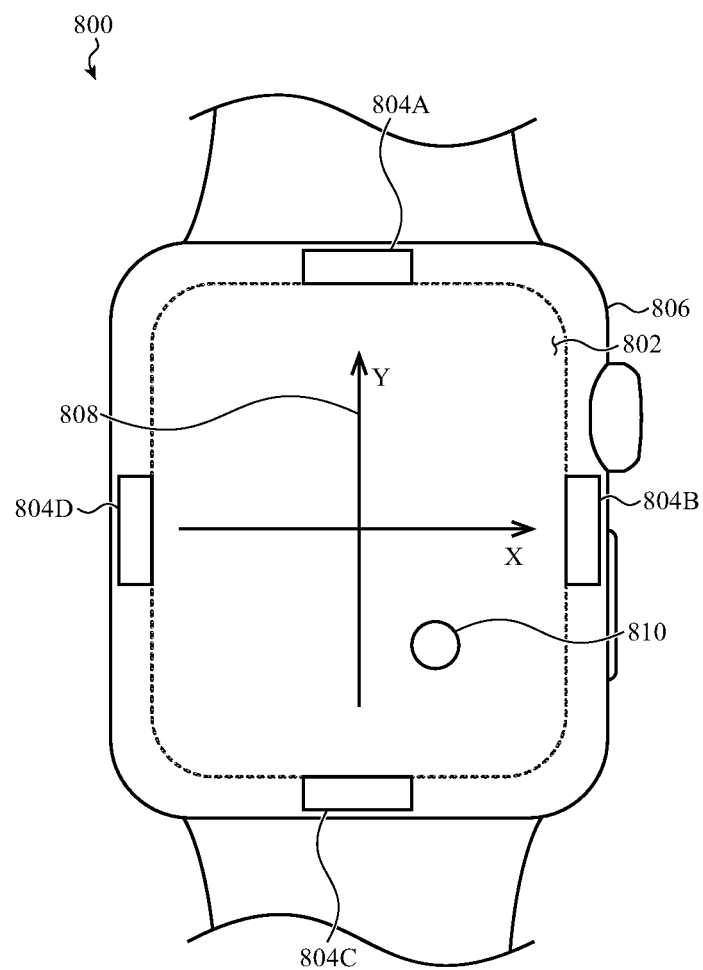
FIG. 8 illustrates an electronic device with an input surface and force sensors, according to an embodiment.

FIG. 8 shows an electronic device 800 with an input surface 802 and force sensors 804A-D that can be used to determine a location of a user applied force on the input surface 802. The input surface includes a peripheral or boundary area 806. In the embodiment shown, the force sensors are configured below the boundary area 806 of the input surface 802. The electronic device 800 may be the smart watch discussed in relation to FIG. 2. Shown overlain on the input surface 802 is virtual axis system 808 that provides reference coordinates for locations on the input surface 802.

The force sensor values from the force sensors 804A-D can be used to determine an estimate for a location on the input surface at which a user applies a force. For the specific embodiment of FIG. 8, the four force sensors 804A-D are located centrally along edges of the input surface 802. When a user applies a force to the input surface 802, a center of mass (also called herein a centroid) in the virtual axis system 808 of the four force sensor values can be formed. That is, the force sensor values are treated as masses applied at the locations of the four force sensors.

For example, when the measured force sensor values for the force sensors 804A-D are respectively 7 gF, 26 gF, 51 gF, and 10 gF (where gF denotes a gram-force: i.e., the force on one gram due to gravity at the earth's surface), at respective scaled locations (0,1), (1,0), (−1,0), and (−1,0) in the axis system 808, the weighted average of the positions of the force sensors 804A-D then is given as ((26-10), (7-51))/94, or approximately (0.17, −0.49). This is illustrated as the point 810 in FIG. 8.

Other electronic devices having more or fewer force sensors can also apply such a weighted average calculation to estimate a location on an input surface at which a force is applied. Examples of such alternative electronic devices include a smartwatch having a triangular (or even a polygonal) display and input surface, with a force sensor positioned at each vertex, and a smart phone having a rectangular display and input surface with multiple force sensors positioned along each edge. Further, these additional embodiments can be configured to use an estimated location in conjunction with another estimate of the location obtained using other sensors, such as touch sensors.

Touch sensors may be used in the embodiments to provide a check for accuracy of the detection and location determinations obtained first using force sensors. For example touch sensors may have separately determined that a user is applying a force on an input surface of an electronic device. An initial check of the touch sensors' values is performed to ensure their validity. For example, a location determination provided by a touch sensor indicating the applied forced is outside the coordinate or position ranges of the input surface would indicate that at least one of the touch sensors was likely incorrectly functioning. If the touch sensor values are determined to be invalid, they are not used for further operations regarding detection of a user applied input, or determination of a location of a user applied input.

Figure 9:
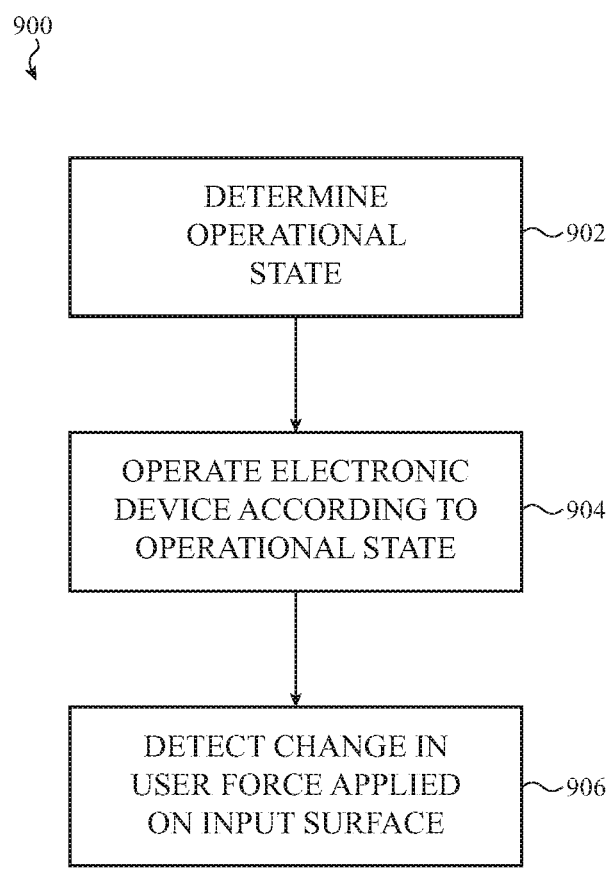
FIG. 9 is a flow chart of a method for operating an electronic device, according to an embodiment.

If, however, the touch sensors' values are determined to be valid, they can be used to refine or update a location of the user applied input that was determined using only the force sensors. The update may be an average, a weighted average or other combination of the location determined by the force sensors and the location determined by the touch sensor FIG. 9 is a flowchart of a method 900 for operating an electronic device, such as the smart watch shown in FIG. 1A or the smart phone shown in FIG. 1B. The method operates according to a state-space algorithm. The electronic device can operate in either of at least two separate operational states. One aspect of the method involves switching the electronic device among the operational states based, in part, on whether a user applied force is, or is not, detected on an input surface of the electronic device. The electronic device includes force sensors configured to detect the user applied force and provide forced sensor values.

In a first operational state the electronic device has determined that no user applied force is being applied to the input surface. In the first operational state the electronic device performs actions that may include receiving force sensor values from the force sensors, updating respective baseline force values to track the force sensor values, and displaying icons on the input surface at which a user may enter a command by applying force. Other actions may also be performed.

In a second operational state a user is currently applying, or has recently been applying, a force to the input surface. While operating according to the second operational state the electronic device may perform actions include freezing baseline force values corresponding to force sensor values for the duration of the user applied force, determining the location on the input surface of the user applied force, responding to the user applied force at the location with a corresponding action, and monitoring the force sensor values. Other actions may also be performed.

At stage 902 a determination is made regarding in which operational state to operate the electronic device. At an initiation of the method, such as a power up of the electronic device, the first operational state may be the default determined state. After the electronic device has been in operation, the determined operational state may need to be altered to another state. The operational state of the electronic device may then be changed.

In stage 904, the electronic device operates according to the determined operational state. Operating the electronic device according to the first operational state includes receiving the force sensor values and respective baseline force values. If the differences between the force sensor values and the respective baseline force values are all less than a threshold, the electronic device updates the baseline force values to track their respective force sensor values. Updating baseline force values to track their respective force sensor values may be as described in relation to FIG. 5. In particular, if a baseline force value is less than its respective force sensor value, it may be updated by adding an amount to make it closer to the force sensor value. The amount added may be capped by a maximum update value. If a baseline force value is greater than its respective force sensor value, it may be updated by equating it to the respective force sensor value.

While operating according to the first operational state, the electronic device may also continue to run applications previously initiated by a user, system background actions, or other programs.

When operating according to the second operational state, the electronic device keeps each baseline force value constant at the value it had at the start of entry into the second operational state. Further, the electronic device calculates a location on the input surface at which the user is applying the force. The location may be where an icon or other indication for a user to enter a command is positioned on the input surface. The electronic device may then perform actions associated with the command, such as starting, stopping or modifying operation of a program or application, or accepting a data entry.

At stage 906, the electronic device detects a functional change in the force being applied to the input surface. That is, the electronic device determines if a change in a force sensor value results from a user. A first such functional change is if, while in the first operational state, there is an increase in a received force sensor value above the baseline force value that exceeds the first threshold. A second such functional change is if, while in the second operational state, there is a decrease in a force sensor value by more than a second threshold in magnitude, indicating a removal of a user applied force.

For at least these two functional changes, the change indicates a need to switch the operational state of the electronic device. Flow then returns to stage 902 at which the operational state may be determined anew, and the method proceeds as before. When the first functional change is detected, the electronic device switches to operating according to the second operational state. This includes freezing the baseline force values. When the second functional change is detected, the electronic device switches to operating according to the first operational state. After so switching, the previously frozen baseline force values may be updated in logarithmic steps to track their respective force sensor values. Other update step sizes may also be used.

Figure 10:
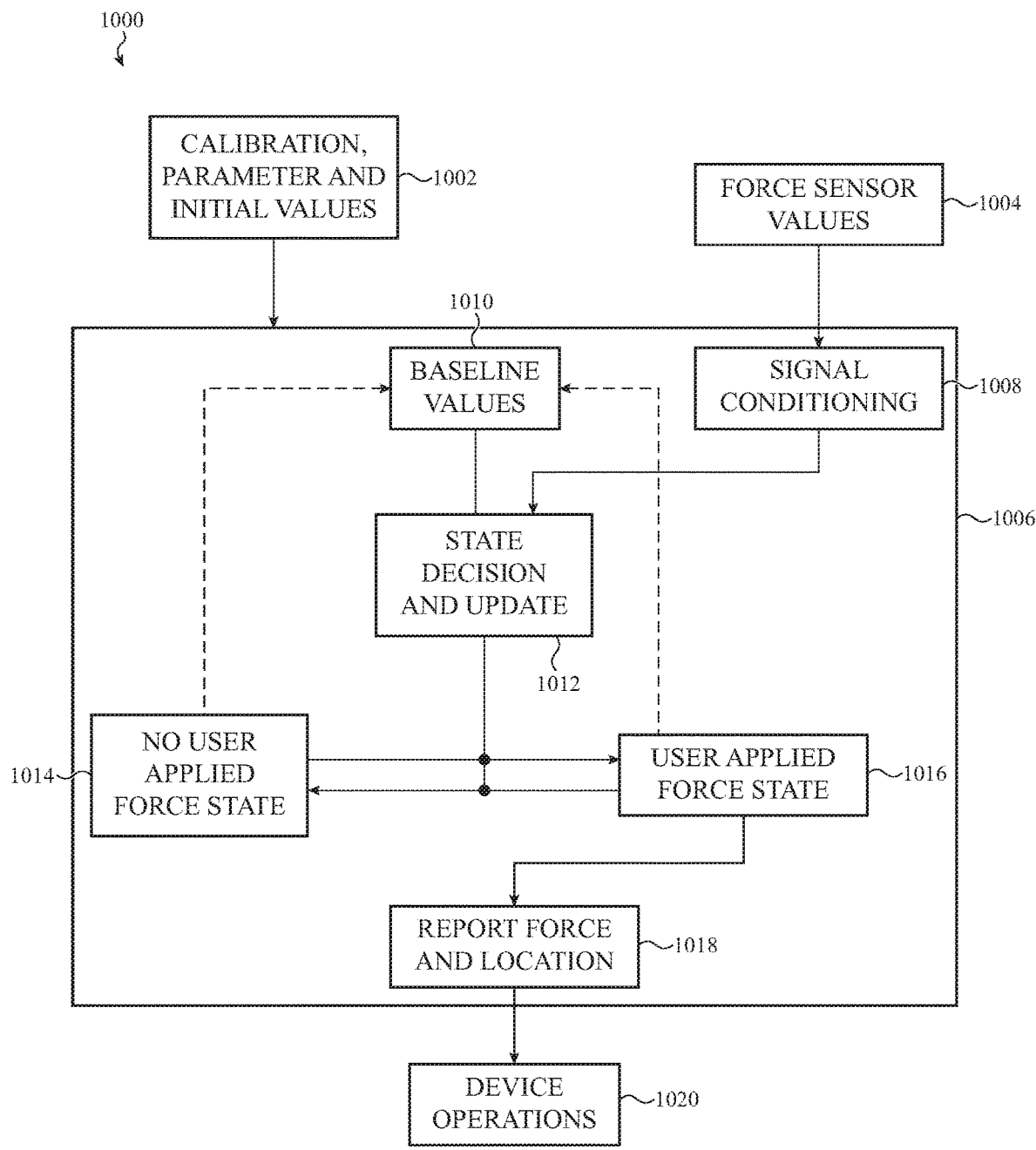
FIG. 10 illustrates a state-space diagram for operation of an electronic device with an input surface with force sensors, according to an embodiment.

FIG. 10 shows a state-space diagram 1000 that implements various state-space methods for operating an electronic device having an input surface on which a user applies a force to enter commands to the electronic device. Such methods include those disclosed in relation to FIG. 9.

The state-space machine 1006 represents the interrelation of the operational states and actions of an electronic device. The operations and operational states may be implemented in a processor as described previously. The state space machine 1006 receives, such as at initiation or startup of the electronic device, various parameters and initial values 1002. These may include threshold values to be used, and initial baseline force values.

The state-space machine 1006 has at least two internal operational states according to which the electronic device can operate. In the embodiment shown, the state-space machine 1006 includes a No User Applied Force operational state 1014, according to which the electronic device operates in the absence of detection of a user applied force on the input surface. The state-space machine 1006 also includes the User Applied Force operational state 1016 according to which the electronic device operates when a user applied force on the input surface is detected.

The state-space machine 1006 functions by determining by which operational state the electronic device is to function. At each decision time instant, the determination proceeds when the state-space machine 1006 receives the most current force sensor values 1004 as inputs. Optional signal conditioning 1008, such as filtering and/or peak clipping, may be performed on the received force sensor values.

The State Decision Update operation 1012 compares the most recent baseline force values 1010 and the respective force sensor values. As previously disclosed, for each force sensor a respective baseline force value is maintained. The State Decision Update operation 1012 may determine either to maintain the current operational state of the electronic device or switch from the current operational state to its alternative. This can be based on a comparison of the force sensor values 1004 and the respective baseline force values 1010. The decision to switch operational states may be based on detection of a functional change in the force being applied to the input surface, as described above in relation to the method of FIG. 9.

When the electronic device is switched into the User Applied Force operational state 1016, the state-space machine 1006 functions by initiating the Report Force and Location 1018 action block. A location at which the user applied force is applied is estimated, such as by the centroid methods described. The estimated location may be corrected as described below in relation to FIGS. 11A-B.

The estimated location is then reported to a Device Operation block 1020 separate from the state-space machine 1006. The actions of the Device Operation block 1020 an affect operations of the electronic device, such as change how an application program is running.

Figure 11A:
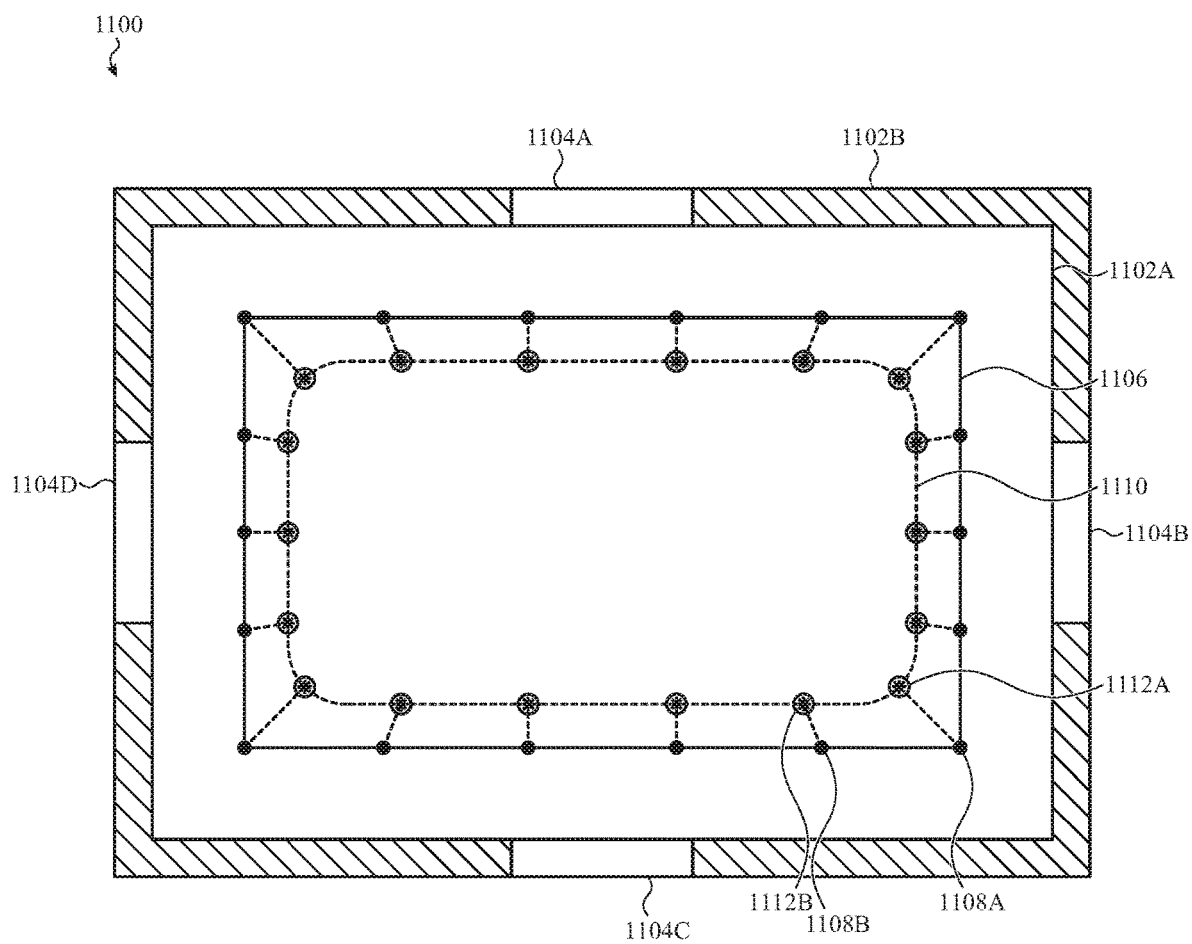
FIG. 11A illustrates locations on an input surface of applied forces and locations estimated by an electronic device, according to an embodiment.
Figure 11B:
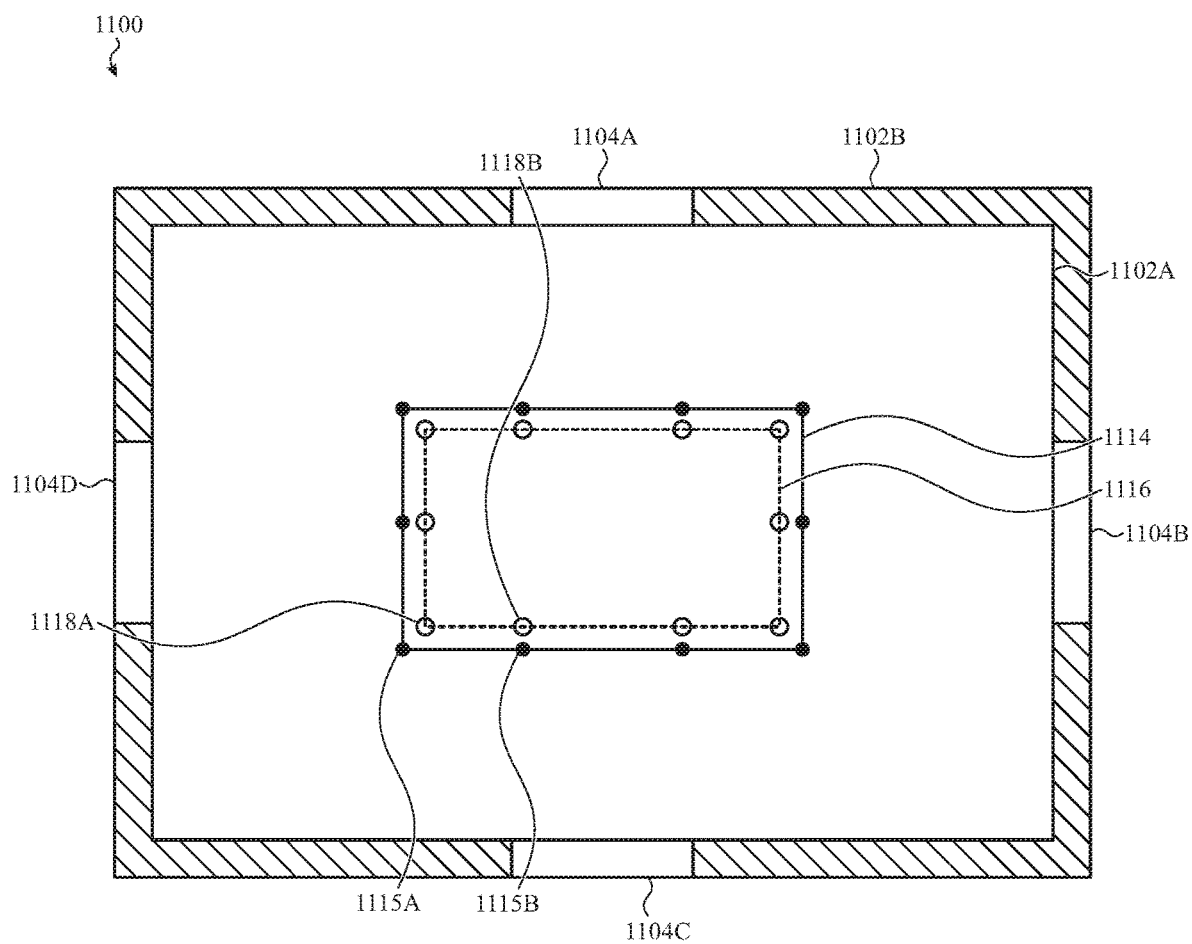
FIG. 11B illustrates locations on an input surface of applied forces and locations estimated by an electronic device, according to an embodiment.

FIGS. 11A-B show an electronic device 1100 having an input surface 1102A on which a user can apply forces to enter commands or information to the electronic device 1100. The electronic device 1100 includes four force sensors 1104A-D, each position centrally with respect to a respective edge of the input surface 1102A. In the embodiment shown the four force sensors 1104A-D are located underneath the boundary area 1102B of the input surface 1102A. The force sensors may be directly configured on the underside of the input surface 1102A, or otherwise positioned to detect forces on the input surface 1102A. The electronic device 1100 may be the electronic device 200 of FIG. 2.

FIG. 11A illustrates an issue that can be mitigated by various embodiments. The virtual (i.e., not an actual physical part of the input surface 1102A) rectangle 1106 indicates locations on the input surface that are equidistant from, and close to, the boundary area 1102B of the input surface 1102A. Forces applied at locations along rectangle 1106, such as at points 1108A-B, may not have their positions precisely determined using certain methods just described. For example, a deflection of a cover glass of the input surface 1102A with an applied force may have a component both perpendicular into the cover glass and a horizontal component towards the center of the input surface 1102A. Forces truly applied at points along the virtual rectangle 1106 (shown as solid dots) may be calculated by certain methods above as being along the virtual ovoid curve 1110. For example, a force truly applied at points 1108A or 1108B could have a centroid calculated to be at respective locations 1112A or 1112B (shown as open dots).

FIG. 11B illustrates the electronic device 1100 just described but with different locations along the virtual rectangle 1114, such as points 1115A and 1115B, at which a force is truly applied. The virtual rectangle 1114 in FIG. 11B is located closer to the center of the input surface 1102A. In this case the locations of the user applied force could be at respective locations 1118A and 1118B along the virtual rectangle 1116. In this case the separation between the location at which the force is truly applied and the respective calculated location is less than for the situation in FIG. 11A. In use, the processor or components of the electronic device 1100 would typically have only the measured or calculated locations, such as 1112A, which are distortions of the locations at which a force is truly applied.

The distortions shown in FIGS. 11A-B can be corrected in various embodiments. In a some embodiments, correction is implemented by applying a single gain to the coordinates of the detected and/or calculated location of the applied force after calculation of the weighted average of the sensor positions, weighted by the respective detected force sensor values. When the gain is implemented as a percent or multiplicative factor, the corrections are larger for points closer to the boundary area 1102B, reflecting the increased for points closer to the boundary area 1102B. In other embodiments, respective gain factors are multiplicatively applied to each of the detected force sensor values before the weighted average is calculated. The gain or gains to be applied can be determined by measurements on the input surface at manufacture, or the gain may be adapted during use, such as in a calibration process.

An alternative embodiment can implemented by applying a conformal mapping of the unit disk to the unit square (or rectangle) representing the face of the electronic device 1100. Such a conformal mapping may be precomputed and sufficient samples stored in a Look Up Table (LUT) of the processor or circuitry of the electronic device 1100. Alternatively, approximations of the conformal map having quickly computable algorithms can be stored and implemented in the processor or circuitry of the electronic device 1100.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of detecting a user input on an input surface of an electronic device, the method comprising:
    receiving a force sensor value from a force sensor of the electronic device;
    receiving a baseline force value for the force sensor;
    comparing the force sensor value to the baseline force value to determine whether a user input occurred on the input surface;
    when the force sensor value exceeds the baseline force value by more than a first threshold:
        freezing the baseline force value; and
        operating the electronic device according to the force sensor value being a detected user input on the input surface; and
    when the force sensor value does not exceed the baseline force value by more than the first threshold:
        operating the electronic device according to no force input being received from a user on the input surface;
        updating the baseline force value toward the force sensor value; and
        using the updated baseline force value to determine whether a subsequent user input occurred on the input surface.

2. The method of claim 1, wherein:
    updating the baseline force value toward the force sensor value includes adding an update value to the baseline force value; wherein
    the update value does not exceed a maximum update limit.

3. The method of claim 1, further comprising:
    determining that the baseline force value subtracted from the force sensor value is negative and exceeds a second threshold in magnitude; wherein:
    the baseline force value is updated toward the force sensor value in response to the determination.

4. The method of claim 1, wherein updating the baseline force value toward the force sensor value comprises setting the baseline force value to the force sensor value.

5. The method of claim 1, wherein:
    the force sensor is a first force sensor;
    the force sensor value is first force sensor value; and
    the method further comprises:
        receiving a second force sensor value from a second force sensor of the electronic device concurrently with receiving the first force sensor value; and
        when the force sensor value exceeds the baseline force value by more than the first threshold, determining, from the first force sensor value and the second force sensor value, a location of the user input on the input surface.

6. The method of claim 5, wherein determining the location of the detected user input on the input surface is based on a calculation of a weighted average, the weighted average calculated using:
    a first position of the first force sensor weighted by the first force sensor value, and
    a second position of the second force sensor weighted by the second forces sensor value.

7. The method of claim 6, further comprising:
    receiving a third force sensor value from a third force sensor of the electronic device concurrently with receiving the first force sensor value; and
    receiving a fourth force sensor value from a fourth force sensor of the electronic device concurrently with receiving the first force sensor value;
    wherein the weighted average includes:
        a third position of the third force sensor weighted with the third force sensor value; and
        a fourth position of the fourth force sensor weighted with the fourth force sensor value.

8. The method of claim 6, wherein the first position of the first force sensor weighted by the first force sensor value is also weighted by a gain.

9. The method of claim 5, further comprising;
    receiving a touch sensor value from a touch sensor of the electronic device;
    determining validity of the touch sensor value; and
    when the touch sensor value is determined to be valid, using the touch sensor value to update the determined location of the detected user input on the input surface.

10. An electronic device comprising:
    an input surface;
    a force sensor at a position proximate to a boundary of the input surface, and configured to detect an input applied to the input surface and provide a force sensor value; and
    a processor configured to operate in response to the input applied to the input surface by:
        receiving the force sensor value;
        receiving a baseline force value for the force sensor;
        comparing the force sensor value to the baseline force value to determine whether a user input occurred on the input surface;
        when the force sensor value exceeds the baseline force value by more than a first threshold:
            freezing the baseline force value; and
            operating the electronic device according to a user having applied a force input to the input surface; and
        when the force sensor value does not exceed the baseline force value by more than the first threshold:
            operating the electronic device according to no force input having been applied to the input surface;
            updating the baseline force value toward the force sensor value; and
            using the updated baseline force value to determine whether a subsequent user input occurred on the input surface.

11. The electronic device of claim 10, wherein:
updating the baseline force value includes adding an update value to the baseline force value; and
the update value does not exceed a maximum update limit.

12. The electronic device of claim 10, wherein the processor is further configured to operate by:
subsequent to freezing the baseline force value, receiving from the force sensor a subsequent force sensor value;
determining that the baseline force value subtracted from the subsequent force sensor value is negative and exceeds a second threshold in magnitude;
updating the baseline force value toward the subsequent force sensor value; and
operating the electronic device according to the user having stopped applying the force input to the input surface.

13. The electronic device of claim 10, wherein:
the force sensor is a first force sensor;
the position of the first force sensor is a first position;
the force sensor value is a first force sensor value;
the electronic device further comprises a second force sensor at a second position proximate to the boundary of the input surface, and configured to detect the input applied to the input surface and provide a second force sensor value; and
the processor is further configured to determine a location of the input applied to the input surface without reference to a touch sensor value from a touch sensor of the electronic device.

14. The electronic device of claim 13, wherein the processor determines the location of the input based on a calculation of a weighted average, the weighted average calculated using:
the first position of the first force sensor weighted by the first force sensor value, and
the second position of the second force sensor weighted by the second force sensor value.

15. The electronic device of claim 14, further comprising:
a third force sensor at a third position proximate to the boundary of the input surface, and configured to detect the input applied to the input surface and provide a third force sensor value; wherein:
the weighted average is further calculated using the third position weighted by the third force sensor value.

16. The electronic device of claim 15, wherein a gain is applied to at least one of the first position, the second position, or the third position to form the weighted average.

17. The electronic device of claim 13, wherein the processor is further configured to operate by:
receiving the touch sensor value from the touch sensor of the electronic device;
determining a validity of the touch sensor value;
when the touch sensor value is determined to be valid, using the touch sensor value to update the determined location on the input surface of the input applied to the input surface.

18. A method of operating an electronic device having an input surface, a plurality of force sensors, and a processor, the method comprising:
receiving, at the processor, respective force sensor values from the plurality of force sensors;
comparing the respective force sensor values to a respective baseline force value to determine, without reference to a touch sensor value, that a force applied to the input surface is applied by a user;
when the force applied to the input surface is determined to be applied by the user:
operating the electronic device according to a first operational state; and
determining a location on the input surface at which the force was applied; and
when the force applied to the input surface is determined not to be applied by the user:
operating the electronic device according to a second operational state; and
updating the baseline force value toward the respective force sensor values.

19. The method of operating an electronic device of claim 18, wherein determining from the respective force sensor values that the force applied to the input surface is applied by the user comprises:
comparing a first force sensor value from a first force sensor of the plurality of force sensors to a first baseline force value; and
determining that the first force sensor value exceeds the first baseline force value by at least a first threshold.

20. The method of operating an electronic device of claim 18, wherein determining the location on the input surface at which the force was applied comprises forming a weighted average using respective positions of the plurality of force sensors weighted by the respective force sensor values.

* * * * *